Dec. 7, 1965  D. A. DE LONG  3,221,437

FISH HOOK WITH WEED GUARD

Filed Oct. 9, 1963

INVENTOR.
DAVID A. DELONG
BY
Meyer, Baldwin, Doran & Egan
ATTORNEYS

United States Patent Office 3,221,437
Patented Dec. 7, 1965

3,221,437
FISH HOOK WITH WEED GUARD
David A. De Long, Cleveland, Ohio, assignor to De Long Lures Inc., a corporation of Ohio
Filed Oct. 9, 1963, Ser. No. 315,059
3 Claims. (Cl. 43—43.4)

This invention relates to improvements in a fish hook with a weed guard attached thereto and more particularly to a novel manner of attaching the weed guard to the fish hook.

One of the objects of the present invention is to provide in combination with a hook having an elongated shank with a barb and point formed at one end thereof and an eye formed at the other end, a weed guard comprising stiff filament material extending through the eye and long enough to reach sufficiently close to the end of the barb of the hook to fend off weeds, and a hollow rivet or eyelet snugly fitting the inside diameter of the eye of the hook and tightly holding the filament at an acute angle to the shank so that no movement is possible relative to the hook after the filament is snugly attached.

Weed guards today are customarily attached to fish hooks by use of solder. Sometimes the wire of the end of the weed guard is secured to the shank of the fish hook by a wire wrapping around the hook shank and may be held in place by a spot of solder. If the solder is not used, then the weed guard tends to rotate around the shank of the fish hook. In other cases, the wire of the weed guard is laid parallel to the shank of the fish hook and attached by the application of solder. In any case, this results in an unsatisfactory assembly because the solder frequently loosens from the shank of the hook.

In attaching the weed guard to a fish hook by the use of solder, the flux used in the soldering operation causes discoloration and corrosion of the shank of the fish hook which is unsightly and starts an undesirable corrosion of the fish hook shank and eye. Furthermore, it is quite common today to mold a lure on the fish hook using a synthetic resin and molding process requiring the application of heat. In such cases, the heat loosens the solder connection for the wire guard, thus rendering the attachment unsatisfactory. It is an object of the present invention to overcome these disadvantages of the prior art and to provide an attractive assembly of a fish hook with a weed guard.

Other objects and advantages of the present invention will be apparent from the accompanying drawings and description and the essential features are summarized in the claims.

In the drawings—

FIG. 6 is a perspective view similar to FIG. 1 but showing a slightly different type of weed guard according to the present invention; while

Figure 1:
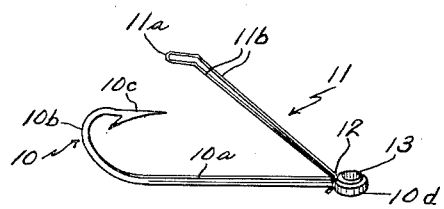
FIG. 1 is a perspective view showing a fish hook with my improved weed guard assembly.
Figure 2:
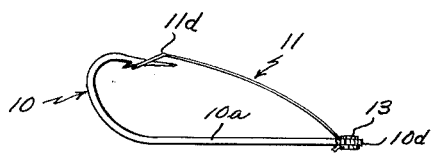
FIG. 2 is a side elevational view of the same showing the weed guard in engagement with the barb of the hook.
Figure 3:
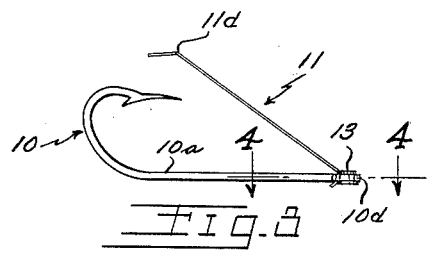
FIG. 3 is a view similar to FIG. 2 but showing the weed guard disengaged from the barb portion.

Referring now to FIGS. 1 through 5, a fish hook 10 of a known variety is equipped with a weed guard 11. The fish hook has an elongated shank portion 10a at one end of which is a hook bend 10b terminating in a hook barb 10c in the usual manner. At the opposite ends, the shank 10a is provided with a substantially circular eye 10d.

Figure 5:
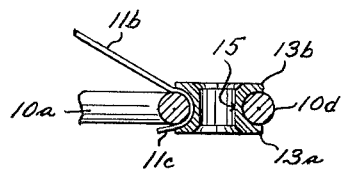
FIG. 5 is a fragmental sectional view taken along the line 5—5 of FIG. 4.
Figure 4:
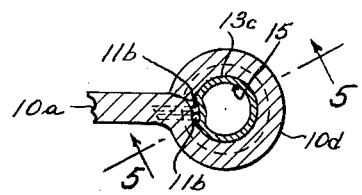
FIG. 4 is a fragmental sectional view, enlarged, taken along the line 4—4 of FIG. 3.

The weed guard 11 is here shown as comprising a stiff filament bent at 11a 180° upon itself to form a loop from which two ends 11b extend away from the loop to a point 12 where the two filaments are substantially in contact where they pass through the eye 10d. The filaments terminate at 11c shortly after they pass through the eye. To hold the weed guard firmly in the eye 10d, a hollow rivet or eyelet 13 of brass of any other suitable material is provided with an outside diameter which snugly fits the inside diameter of the eye 10d. The rivet passes through the eye and is provided with flanged ends 13a and 13b upset tightly against opposite faces of the eye 10d. As best seen in FIGS. 4 and 5, it results from this construction that the central or generally cylindrical portion 13c of the hollow rivet presses tightly against the filaments 11b where they pass through the eye generally parallel to the axis of the eye and in a plane passing approximately through the central axis of said rivet, thus holding these filaments against movement endwise of their length relative to the eye and also preventing any rotational movement of the filaments relative to the eye.

Usually, but not necessarily, the filaments 11b are bent slightly as indicated at 11d near the point where weed guard approaches the barb 10c of the hook.

In use of the above described invention, a line is passed through the hollow rivet 13 and attached to the fishing rod. The weed guard 11 is placed in the position of FIG. 2 so that as the fish hook with attached bait or lure is drawn through the water, the guard 11 will fend away any weeds. Upon the fish striking the hook, the weed guard quickly disengages from the barb and point 10c and flies to the position of FIG. 3 due to the stiff somewhat spring characteristic of the filaments 11b.

While the weed guard is often formed of wire having spring characteristics, it may also be made of a synthetic resin material or of fiber glass or of monofilament.

Figure 6:
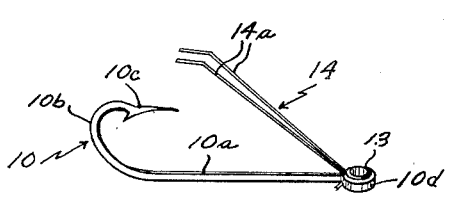

Another form of weed guard is shown in FIG. 6. This is customarily referred to as the Wisconsin type. All similar parts of the fish hook and of the hollow rivet are given the same reference characters as in the previous description. The only difference here is that the weed guard 14 comprises two separate filaments 14a (usually two ends extending from a loop attached to the hook shank) which are generally parallel to each other but which pass through the eye 10d substantially in contact as shown in FIG. 4, and the two filaments then diverge slightly as they extend away from the eye as shown in FIG. 6 to the terminal or outer end thereof where they are separated approximately 1/16 inch. This form of the invention is exactly like that described in connection with FIGS. 1 to 5 except that it has two separate filaments not connected by the bight 11a of the loop shown in the first form. In use, the hook with weed guard shown in FIG. 6 is attached to a line passing through the hollow rivet 13 and when pulled through the water the filaments 14a are bent closely to the barb 10c of the hook and lie sufficiently close to the end of the barb and point to fend off the weeds.

Figure 7:
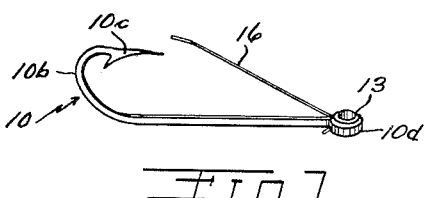
FIG. 7 is a perspective view similar to FIG. 6 but showing a guard with a single wire.

FIG. 7 is like FIG. 6 except that a single filament 16 replaces the two filaments 14a. The hollow rivet fastening 13 is the same as in FIG. 6.

It results from this invention that no damage occurs to the fish hook by the attachment of the weed guard thereto utilizing the hollow rivet 13. No flux is needed and, therefore, there is no corrosion or unsightly condition of the fish hook. Also, the eyelet or rivet 13 provides a smooth generally cylindrical passageway 15 through the center of the hollow rivet making a smooth attachment for the line of the user. In addition to this, the weed guard 11 or 14 is easily attached to the hook by simply upsetting the ends 13a and 13b of the hollow rivet tightly against the eye of the hook 10d. This firmly holds the weed guard in position and is permanent whatever else is done with the hook and it remains in satisfactory condition even though heat is applied to the hook in molding a lure thereon or otherwise.

Utilizing my invention, I can attach a steel wire of spring characteristics having a diameter of 0.008 inch so firmly in position as a weed guard that it performs as successfully as a wire of 0.012 inch diameter attached to the fish hook by the older methods of wrapping the weed guard wire around the shank of the fish hook and/or attaching the same to the fish hook by the use of solder. This is an advantage because the lighter gauge wire used in the weed guard is less easily seen by the fish and is more easily moved from the position of FIG. 1 to the position of FIG. 3 when a strike is made.

What is claimed is:

1. A fish hook with weed guard comprising a hook having an elongated shank with a hook bend at one end terminating in a barb and point and with a circular eye at the other end, a weed guard consisting of at least one stiff filament passing through said eye generally parallel to the axis of the eye and extending away from said eye at an acute angle to said shank, a hollow rivet snugly fitting the inside diameter of said eye and having a central generally cylindrical portion tightly holding said filament there between said rivet and said eye in a plane passing approximately through the central axis of said rivet, opposite ends of said rivet being upset against opposite faces of said eye, whereby said filament is held against movement endwise of its length relative to said eye and held also against rotational movement relative to said eye, and said filament so assembled being of a length to lie sufficiently close to the end of said barb and point to fend off weeds.

2. A fish hook as defined in claim 1, wherein said filament is steel wire of spring characteristics and not substantially over 0.008 inch in diameter, whereby to decrease the visibility of said weed guard while retaining the weed fending capacity and fish striking capability.

3. A fish hook as defined in claim 2, wherein there are two of said filaments passing through said eye and there parallel and substantially in mutual contact, said filaments diverging toward said barb and point and there having free ends separated not substantially more than one-sixteenth inch at their outer ends.

References Cited by the Examiner
UNITED STATES PATENTS

| | | | |
|---|---|---|---|
| 797,281 | 8/1905 | Henzel | 43—43.6 |
| 2,160,347 | 5/1939 | Walsh | 43—43.6 |
| 2,576,795 | 11/1951 | Lane. | |
| 2,895,252 | 7/1959 | Tibbetts | 43—43.2 |

SAMUEL KOREN, *Primary Examiner.*

JOSEPH S. REICH, ABRAHAM G. STONE, *Examiners.*